US010520720B2

(12) United States Patent
Hall

(10) Patent No.: US 10,520,720 B2
(45) Date of Patent: Dec. 31, 2019

(54) LARGE FORMAT BIOCULAR LENS

(71) Applicant: United States of America, as represented by the Secretary of the Army, Fort Belvoir, VA (US)

(72) Inventor: John M. Hall, Stafford, VA (US)

(73) Assignee: UNITED STATES OF AMERICA, AS REPRESENTED BY THE SECRETARY OF THE ARMY, Washington, DC (US)

(*) Notice: Subject to any disclaimer, the term of this patent is extended or adjusted under 35 U.S.C. 154(b) by 17 days.

(21) Appl. No.: 15/613,332

(22) Filed: Jun. 5, 2017

(65) Prior Publication Data
US 2018/0348503 A1 Dec. 6, 2018

(51) Int. Cl.
| G02B 21/18 | (2006.01) |
| G02B 25/00 | (2006.01) |
| G02B 27/01 | (2006.01) |
| G02B 25/04 | (2006.01) |
| G02B 27/02 | (2006.01) |

(52) U.S. Cl.
CPC ....... *G02B 25/001* (2013.01); *G02B 27/0172* (2013.01); *G02B 25/04* (2013.01); *G02B 27/025* (2013.01); *G02B 2027/0132* (2013.01); *G02B 2027/0136* (2013.01)

(58) Field of Classification Search
CPC ... G02B 21/22; G02B 21/0012; G02B 21/361
See application file for complete search history.

(56) References Cited

U.S. PATENT DOCUMENTS

| 3,922,072 | A |   | 11/1975 | Rogers |   |
| 4,076,978 | A | * | 2/1978  | Brennan | G02B 6/06 250/214 VT |
| 4,126,387 | A | * | 11/1978 | Broome | G03B 21/11 353/26 R |
| 4,183,624 | A |   | 1/1980  | Rogers et al. |   |
| 4,247,185 | A | * | 1/1981  | Margolin | G03B 21/11 353/77 |
| 4,392,710 | A | * | 7/1983  | Rogers | G02B 17/0808 359/365 |
| 5,035,474 | A | * | 7/1991  | Moss | G02B 27/01 359/13 |
| 5,151,823 | A |   | 9/1992  | Chen |   |
| 5,477,395 | A |   | 12/1995 | Cook |   |
| 6,219,186 | B1 |  | 4/2001  | Hebert |   |
| 6,274,868 | B1 |  | 8/2001  | Hall et al. |   |
| 7,804,651 | B2 |  | 9/2010  | Janeczko et al. |   |

(Continued)

OTHER PUBLICATIONS

Philip J. Rogers, "Biocular Magnifiers—A Review," Proc. SPIE 0554, 1985, International Lens Design Conference, (Feb. 14, 1986); doi: 10.1117/12.949263.

*Primary Examiner* — William R Alexander
*Assistant Examiner* — Tamara Y. Washington
(74) *Attorney, Agent, or Firm* — Richard J. Kim

(57) ABSTRACT

A novel optical design form for a biocular lens arrangement having a large format focal plane and large eye relief zone is disclosed. Key aspects of a large format biocular lens arrangement are: Lightweight plastic design for all but outermost lens, where more durable glass is desired; a large front aperture for comfortable eye motion; improved eye channel overlapping field of view with minimal distortion; and full color resolution.

20 Claims, 3 Drawing Sheets

(56) References Cited

U.S. PATENT DOCUMENTS

| | | | |
|---|---|---|---|
| 9,151,954 B2* | 10/2015 | Magyari | G02B 27/0172 |
| 2002/0123550 A1* | 9/2002 | Border | B82Y 30/00 |
| | | | 524/425 |
| 2016/0363759 A1* | 12/2016 | Sudo | H04N 5/23293 |

* cited by examiner

LARGE FORMAT BIOCULAR LENS

GOVERNMENT INTEREST

The invention described herein may be manufactured, used, sold, imported, and/or licensed by or for the Government of the United States of America.

FIELD OF THE INVENTION

This invention is applicable to the field of optics, particularly in regards to a large format biocular lens arrangement.

BACKGROUND OF THE INVENTION

A "biocular" is a lens assembly which permits a human observer to view a magnified image of a single image source with both eyes looking through a common optical aperture. Biocular eyepieces are commonly used to magnify the image of a miniature cathode ray tube (CRT), image intensifiers, and flat panel micro-display image sources. Biocular lenses are widely used in head-up and head-down displays for both modern military and commercial aircraft, flight simulators, microscopes for semiconductor device inspection, and medical applications. The chief advantage of using a biocular eyepiece, as compared to a monocular eyepiece or a binocular eyepiece, is that the observer is able to freely move his head and use both eyes to see essentially the same image at the same light level on the same optical system. Typically, bioculars operate with image source format sizes on the order of 35 to 52 mm. In order to accommodate the standard range of human interpupillary distances from 55 to 72 mm, a biocular lens will typically have a front aperture diameter of about 60-80 mm. The apparent horizontal field of view is typically on the order of 36° or so. Because of the fact that each eye is viewing the image from a different vantage point, the correction of spherical aberration, longitudinal chromatic aberration, and sphero-chromatism within the biocular lens is necessary to avoid the experience of image "swimming" when the viewer is moving his eyes. The longitudinal chromatic aberration and sphero-chromatism must be corrected or otherwise eye strain will occur. These problems have resulted in relatively complex conventional biocular eye pieces. In many prior art cases, the optical aberrations prevented making the front aperture much larger than the interpupillary distance, which in turn imposes limitations that the left and right eyes individually cannot see the entire image, and only through fusion in the human brain can a complete field of vision be comprehended. Classical biocular eyepieces such as those disclosed in U.S. Pat. Nos. 3,922,072 and 4,183,624 require at least five to six refractive optical elements and generally have an overall length about twice that of the effective focal length.

SUMMARY OF THE INVENTION

A novel optical design form for a biocular lens having a large format focal plane and large eye relief zone is disclosed. Key novel aspects of an exemplary large format biocular lens arrangement are: Lightweight plastic design for all but outermost lens, where more durable glass is desired; much larger front aperture for comfortable eye motion compared to prior art; improved eye channel overlapping field of view with minimal distortion; and exceptional full color resolution limited by the display pixel size.

BRIEF DESCRIPTION OF THE DRAWINGS

Additional advantages and features will become apparent as the subject invention becomes better understood by reference to the following detailed description when considered in conjunction with the accompanying drawings wherein.

DETAILED DESCRIPTION

The present invention details a unique lens design for a relatively large format display on the order of 140 mm, roughly three times that of the typical art, and nearly twice as wide as the normal maximum human eye pupil separation. This is enabled by the recent proliferation of cell phone device displays, which utilize what has evolved as a standard 5.5" display diagonal dimension with pixel densities often as high as 2160×1440, and in some cases up to 3840×2160 color pixels. The larger display size requires less total optical magnification to achieve the same general field of view as the prior art, but it allows an even larger aperture space within which the operator's eyes may move comfortably, thereby dramatically improving the appeal of the invention. The reduced magnification also enables the use of lightweight plastics for the optical lens materials, which can significantly reduce the weight when compared to the glass-heavy prior art. The invention is best described by referencing FIG. 1 below.

Figure 1:
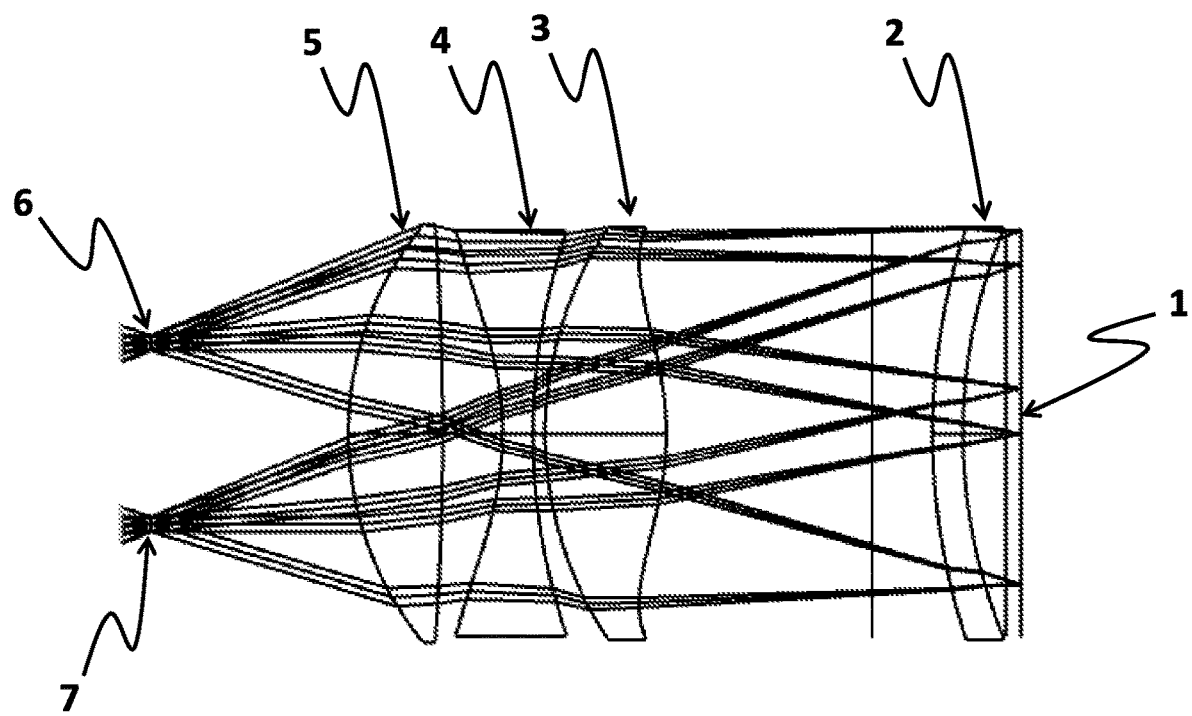
FIG. 1 shows an exemplary arrangement of large format biocular lens.

FIG. 1 shows an exemplary arrangement of large format biocular lens. Per FIG. 1 above, Light originates at the large format panel 1, which typically includes a thin glass window. The panel 1 provides up to 2160×3840 illuminated color pixels within roughly a 120×70 mm format size. Examples of devices with these features include the Samsung Galaxy 6 and the Sony Z5 Premium cell phones. Light travels from the large format display panel 1 through a sequence of lenses 2, 3, 4, & 5. The first lens encountered 2 is of meniscus shape and may be made from optical grade acrylic plastic ($N_d$ 1.4917, $V_d$ 55.31). It has a weak power of approximately −0.48 diopters. Its position near the final focus gives it the ability to function as a "field flattener" which reduces the field curvature aberrations. The next lens in sequence 3 is part of an air-spaced triplet. The element 3 is also made of acrylic, and it has a bi-convex shape providing approximately 8.60 diopters of positive optical power. It also features a strong aspheric curvature to enable additional correction of field aberrations. The following element 4 has a bi-convex shape to provide a −8.83 diopters of negative power. Its material is polystyrene plastic which has different index and dispersion values ($N_d$ 1.5905, $V_d$ 30.87) compared to acrylic in order to provide color correction over the visible photopic spectrum. All the plastic lenses may be produced by the known art of single point diamond turning, or in the case of large volume production, by injection molding processes which are also common in the art. The outermost lens 5 is made of durable S-PHM53 optical glass ($N_d$ 1.603, $V_d$ 65.44). It has a bi-convex spherical shape to provide approximately 6.1 diopters of power, and its outer diameter is 138 mm. This large outer diameter enables each eye to independently see most of the field of vision, roughly 36° out of a total 40° horizontal field of view. The total length of the invention is about 223 mm, which is very compact considering the focal length is about 165 mm. The glass lens 5 can be produced by optical glass shops using traditional grinding and polishing techniques. All lenses can feature thin film coatings well known in the art to reduce back-reflections and enhance the total transmission of light from the display panel 1. The left and right eye positions are shown by their respective optical raytraces, 6 & 7. In each case, the eye is assumed to have a pupil diameter of 5 mm and a relief distance position from the outer lens 5 of about 65 mm.

Figure 2:
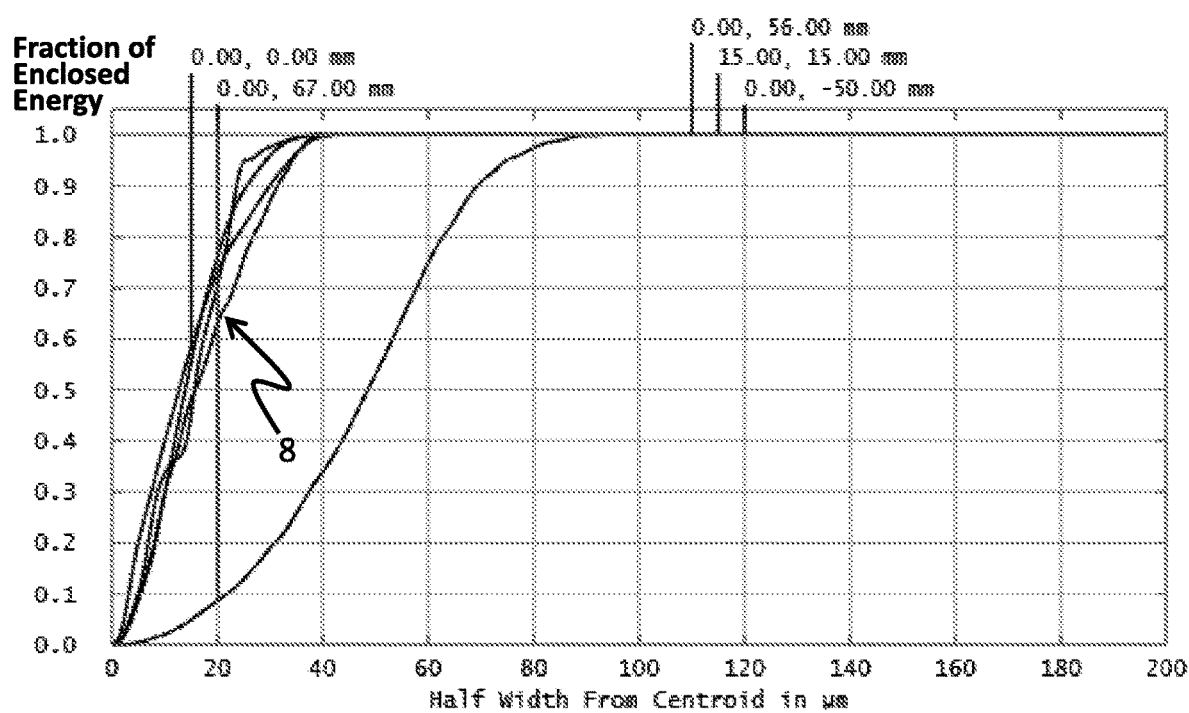
FIG. 2 shows an ensquared energy graphic plot of a focused energy spot for a variety of positions on an image plane source.

FIG. 2 below shows a graphic plot of the ensquared energy of the focused energy spot for a variety of positions on the image plane source 1. Ensquared energy is the percentage of focused light that falls within a square volume dictated by the half-width per the graph. Typical large format displays have pixel half-widths on the order of 0.020 mm. The graph positions identified by 8 show that nearly the entire field of view of the lens provides over 60% ensquared energy for a typical 0.020 mm pixel half-width, meaning that the optical image quality is sufficient to resolve the display pixels.

Figure 3:
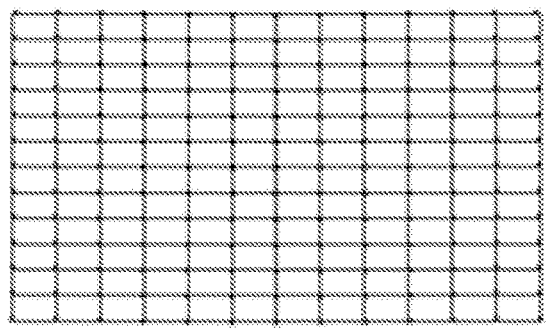
FIG. 3 graphically demonstrates that the geometric distortion of an exemplary larger format biocular lens arrangement is a barely detectable −1.345%.

FIG. 3 below shows graphically that the geometric distortion of the exemplary larger format biocular lens arrangement is a barely detectable −1.345%. The overlap between left and right eyes is contained within the center portion of this graphic, wherein the disparity between eye vergence angles is on the order of 1 mrad or less. This level of performance prevents the artifact of image "swimming" motion as the eyes are moved within the optical aperture.

Key aspects/novelty for such an exemplary arrangement of large format biocular lens can be summarized as:

Lightweight plastic design for all but outermost lens (where more durable glass is desired).

Much larger front aperture for comfortable eye motion compared to prior art.

Improved eye channel overlapping field of view with minimal distortion.

Exceptional full color resolution limited by the display pixel size.

It is obvious that many modifications and variations of the present invention are possible in light of the above teachings. It is therefore to be understood that within the scope of the appended claims, the invention may be practiced otherwise than as described.

What is claimed is:

1. A large format biocular lens arrangement, comprising:
   a large format display panel having a linear dimension greater than a normal maximum human eye pupil separation of 72 mm;
   a first meniscus shaped lens;
   a second bi-convex shaped lens to provide a positive optical power;
   a third bi-convex shaped lens to provide a negative optical power; and
   a single outermost bi-convex spherical shaped optical lens to allow left and right eyes to see a biocular view through said single outermost bi-convex spherical shaped optical lens, enabling each of a viewer's eyes to independently see a defined field of vision.

2. The large format biocular lens arrangement according to claim 1, wherein the large format display panel provides up to 2160×3840 illuminated color pixels within approximately a 120×70 mm format size.

3. A large format lens arrangement, comprising:
   a large format display panel sized on the order of 140 mm;
   a first meniscus shaped lens;
   a second bi-convex shaped lens to provide a positive optical power;
   a third lens to provide a negative optical power; and
   a single outermost bi-convex spherical shaped optical lens, wherein said outermost bi-convex spherical shaped optical lens has a diameter of about 138 mm to allow both eyes of a viewer to directly see through said single outermost bi-convex spherical shaped optical lens and view said large format display panel using said both eyes.

4. The large format biocular lens arrangement according to claim 1, wherein the large format display panel utilizes a standard 5.5″ display diagonal dimension with pixel densities as high as 2160×1440 or 3840×2160 color pixels.

5. The large format biocular lens arrangement according to claim 1, wherein said first meniscus shaped lens is an acrylic lens having an index value $N_d$ of 1.4917, and a dispersion value $V_d$ of 55.31.

6. The large format biocular lens arrangement according to claim 1, wherein said first meniscus shaped lens is an acrylic lens having a weak power of approximately −0.48 diopters.

7. The large format biocular lens arrangement according to claim 1, wherein said first meniscus shaped lens is an acrylic lens disposed near a final focus to function as a field flattener to reduce field curvature aberrations.

8. The large format biocular lens arrangement according to claim 1, wherein said second bi-convex shaped lens is an acrylic lens which forms a part of an air-spaced triplet, said bi-convex shape providing approximately 8.60 diopters of positive optical power.

9. The large format biocular lens arrangement according to claim 1, wherein said second bi-convex shaped lens is an acrylic lens which features a strong aspheric curvature to correct field aberrations.

10. The large format biocular lens arrangement according to claim 1, wherein said third lens provides a −8.83 diopters of negative power.

11. The large format biocular lens arrangement according to claim 1, wherein said third lens is based on a polystyrene plastic having an index value of $N_d$ 1.5905 and a dispersion value $V_d$ of 30.87.

12. The large format biocular lens arrangement according to claim 1, wherein said third lens is based on a polystyrene plastic which has index and dispersion values which differ from the index and dispersion values of an acrylic lens in order to provide color correction over a visible photopic spectrum.

13. The large format biocular lens arrangement according to claim 1, wherein said outermost bi-convex spherical shaped optical lens is made of durable S-PHM53 optical glass which has an index value of $N_d$ 1.603 and a dispersion value $V_d$ of 65.44.

14. The large format biocular lens arrangement according to claim 1, wherein said outermost bi-convex spherical shaped optical lens has an outer diameter of 138 mm and provides approximately 6.1 diopters of power.

15. The large format biocular lens arrangement according to claim 1, wherein a large outer diameter of said outermost bi-convex spherical shaped optical lens enables each eye to independently see roughly 36° out of a total 40° horizontal field of view.

16. The large format biocular lens arrangement according to claim 1, wherein said large format biocular lens arrangement has a compact length of about 223 mm, and is capable of achieving a focal length of about 165 mm.

17. A method of displaying an image for biocular viewing with both eyes using a large format lens arrangement, the steps of the method comprising:

an image is displayed from a large format display panel sized wider than a normal maximum human eye pupil separation of 72 mm;

the displayed image is optically passed through a first meniscus shaped lens to function as a field flattener and flatten a field of the displayed image;

the field flattened image is passed through a second bi-convex shaped lens which provide a positive optical power and additional correction of field aberrations;

the field aberrations corrected image is passed through a third bi-convex shaped lens to provide a negative optical power and a color correction over a visible photopic spectrum; and the color corrected image is viewed by left and right eyes through a single outermost bi-convex spherical shaped optical lens to allow a biocular view, enabling each of a viewer's eyes to independently see a defined field of vision.

18. The method of displaying an image for biocular viewing with both eyes using a large format biocular lens arrangement according to claim 17, wherein said first meniscus shaped lens is an acrylic lens disposed near a final focus to function as a field flattener.

19. The method of displaying an image for biocular viewing with both eyes using a large format biocular lens arrangement according to claim 17, wherein at least one of said lenses are plastic lenses which can be produced by either diamond turning or injection molding, whereas said outermost bi-convex spherical shaped optical lens is a glass lens which may be finished by grinding or polishing.

20. The method of displaying an image for biocular viewing with both eyes using a large format biocular lens arrangement according to claim 17, wherein said lenses can feature thin film coatings to reduce back-reflections and enhance total transmission of light from said large format display panel.

* * * * *